United States Patent [19]

Wilkes et al.

[11] 4,313,300
[45] Feb. 2, 1982

[54] NOX REDUCTION IN A COMBINED GAS-STEAM POWER PLANT

[75] Inventors: Colin Wilkes, Scotia; Bruce W. Gerhold, Rexford, both of N.Y.

[73] Assignee: General Electric Company, Schenectady, N.Y.

[21] Appl. No.: 113,635

[22] Filed: Jan. 21, 1980

[51] Int. Cl.³ .............................................. F02C 6/18
[52] U.S. Cl. ............................. 60/39.02; 60/39.18 B; 60/39.52
[58] Field of Search ............. 60/39.02, 39.18 B, 39.52, 60/39.12

[56] References Cited

U.S. PATENT DOCUMENTS

| | | | |
|---|---|---|---|
| 3,703,807 | 11/1972 | Rice | 60/39.52 |
| 4,049,299 | 9/1977 | Rigollot | 60/39.52 |
| 4,133,171 | 1/1979 | Earnest et al. | 60/39.52 |

*Primary Examiner*—Louis J. Casaregola
*Attorney, Agent, or Firm*—Jerome C. Squillaro

[57] ABSTRACT

The quantity of NOx emissions generated by a combined gas turbine-steam boiler power plant is controlled by recycling a controlled amount of the steam boiler exhaust gas to the air compressor of the gas turbine such that the recycled gases constitutes up to about 30% of the fluid flowing through the air compressor and by cooling the recycled steam boiler exhaust gases to about the desired gas turbine compressor inlet temperature prior to its introduction into the air compressor.

7 Claims, 5 Drawing Figures

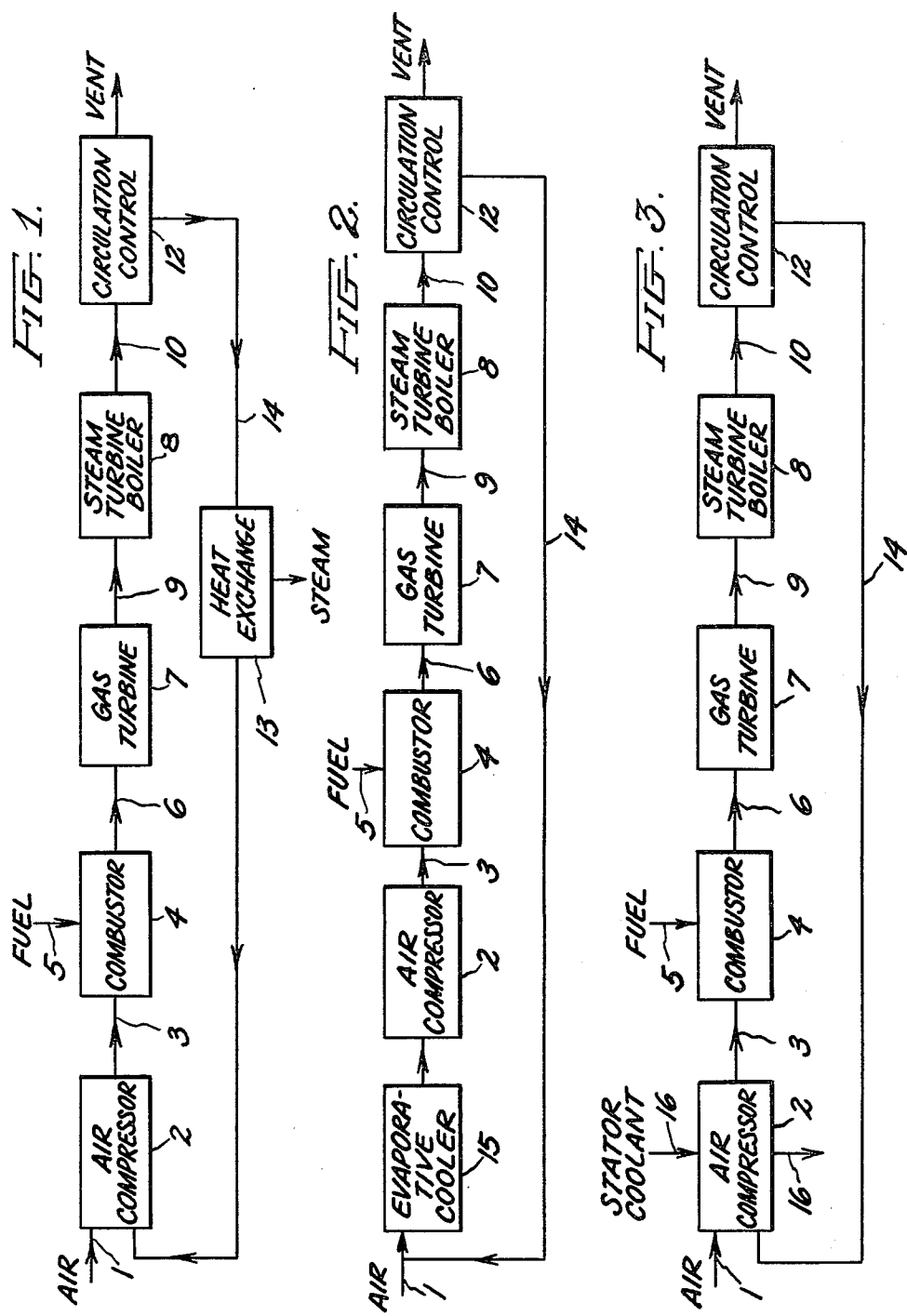

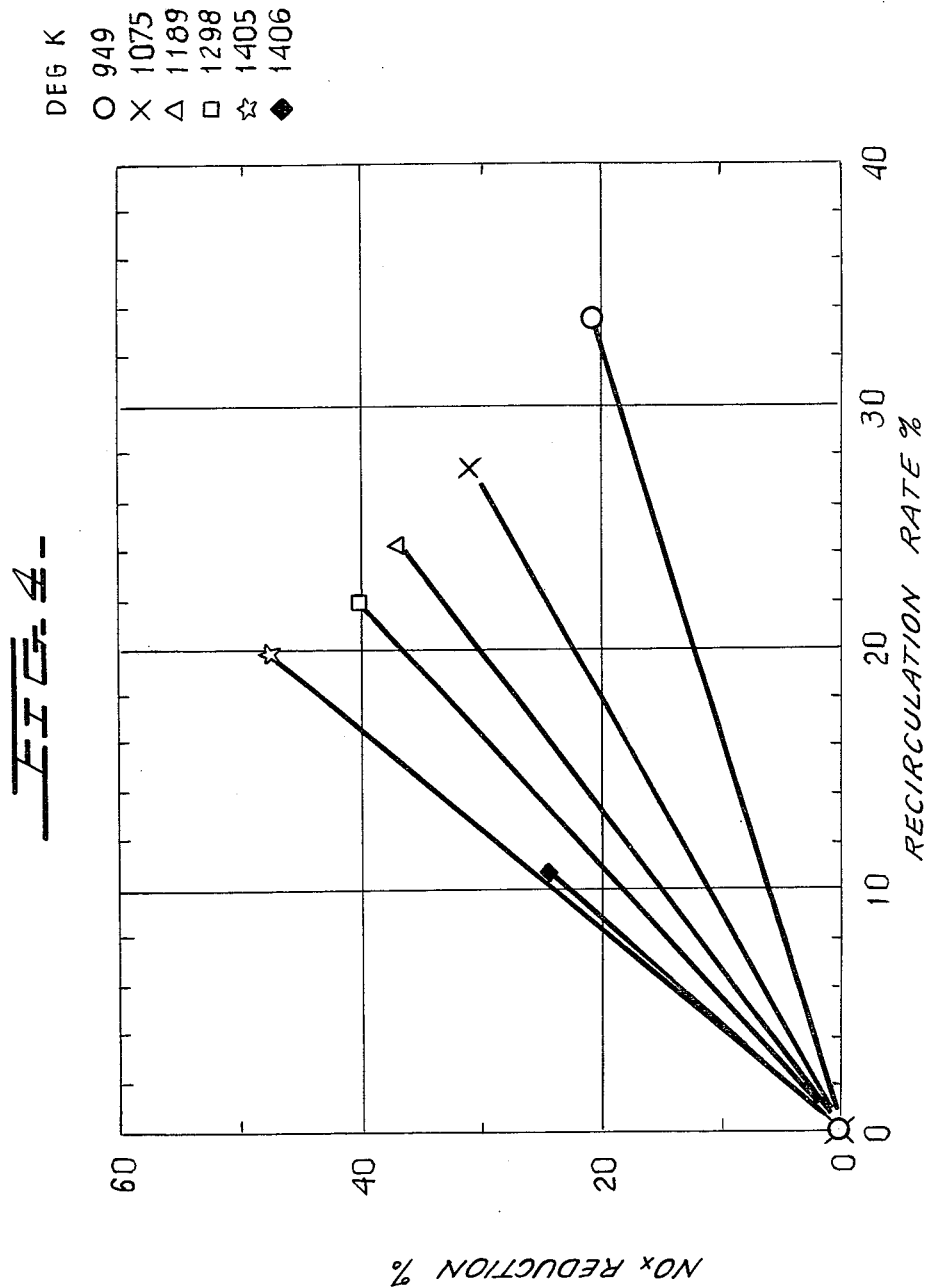

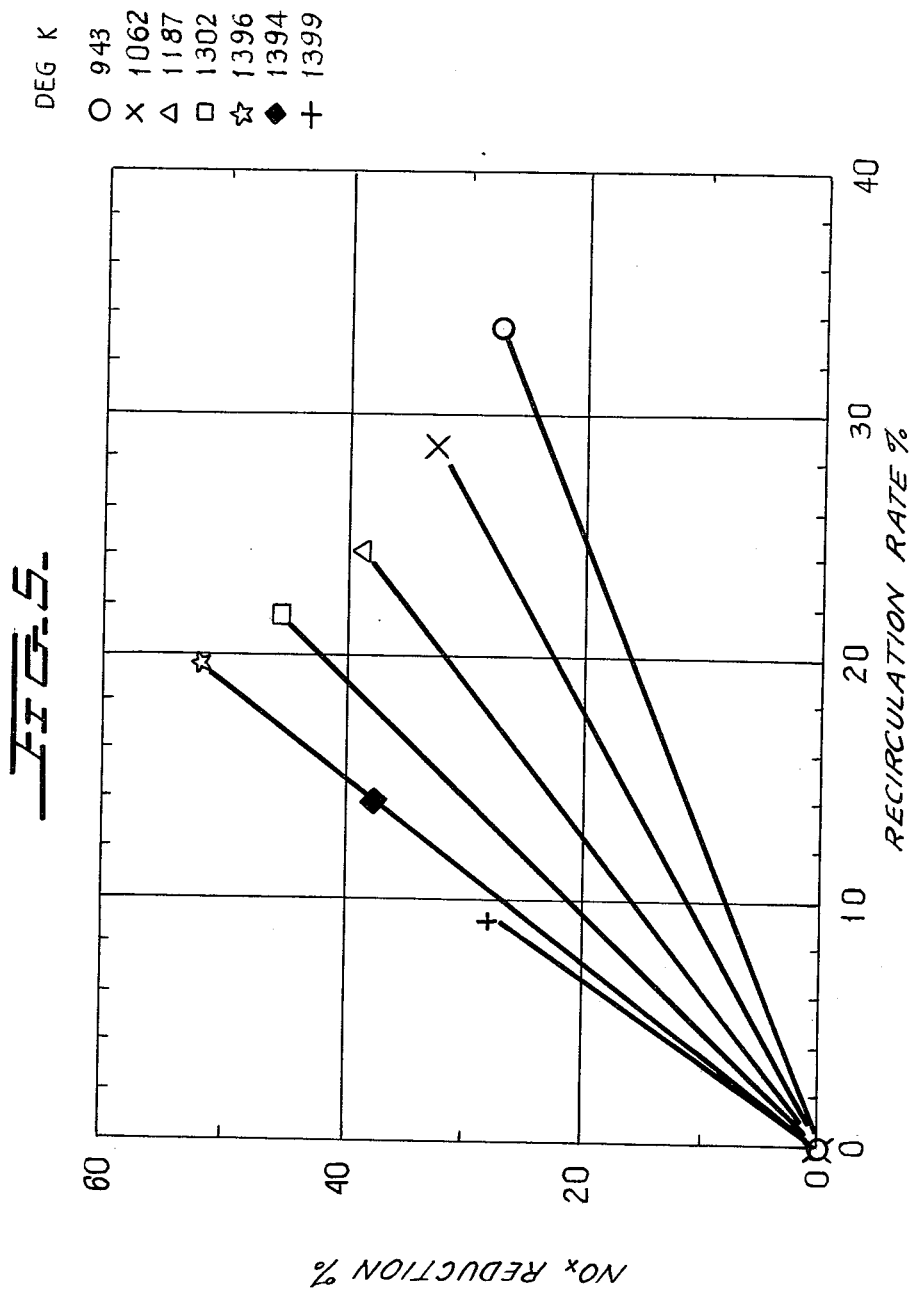

NOX REDUCTION IN A COMBINED GAS-STEAM POWER PLANT

BACKGROUND OF THE INVENTION

The abatement of emissions, particularly the oxides of nitrogen (NOx) is gaining ever increasing attention and significant resources are being applied to the associated problems. In the burning of a fuel, the oxides of nitrogen result from the high temperature oxidation of the nitrogen from the air and the oxidation of nitrogen in the fuel. In liquid fuels, the fuel nitrogen may be present in the form of any of the nitrogen bearing hydrocarbon compounds of which pyridine is one example. In gaseous fuel, the fuel nitrogen may be present in the form of ammonia or some other nitrogen compound.

The level of NOx emissions is being regulated by many governmental agencies. For example, the United States Environmental Protection Agency has proposed rules for stationary gas turbines which limit the emission of NOx to 75 ppmv corrected to 15% oxygen by volume and a heat rate of 13646 BTU/Kw.Hr. 42 Fed. Reg. page 53782 (Oct. 3, 1977). Some governmental codes are now in effect as exemplified by Los Angeles County Rule No. 67 issued by the Los Angeles County Air Pollution Control District which requires the control of NOx emission from industrial gas turbines in Southern California.

Presently, the NOx code requirements and proposed requirements can only be met by injecting steam or water directly into the reaction zone of the stationary gas turbine combustor. However, as fuel costs continue to increase, a greater emphasis is being placed on the heat rate of the power generating system and while water injection is very effective at reducing NOx and will allow an increase in power output, there is a small but significant increase in heat rate. In addition, an advantage of a gas turbine over other types of power generating plants has been its ability to operate in a wide variety of climates without the need for a cooling water supply. Still further, difficulties are encountered in supplying water of sufficient purity to prevent damage to the turbine. Multistage combustion systems are now under development but these systems are relatively new, complex and expensive.

Systems have been known in which NOx is minimized in a gas turbine engine and in other systems in which an exhaust gas from a preliminary combustor is utilized as the primary source of air for the main combustor. See, e.g., U.S. Pat. Nos. 3,792,581, 4,009,689 and 4,147,141. Rice, 3,703,807, teaches a combined gas-steam turbine power plant in which a portion of the exhaust gas from the boiler stack is recycled to the compressor. Stettler, U.S. Pat. No. 3,969,892 discloses a gas turbine system in which a portion of the exhaust gas from the burner is recycled through a heat exchanger and then back into the burner with a resulting reduction in nitrogen oxide in the exhaust; to effectively reduce the NOx emissions, the rate of the recycled gases is about twice the weight of the entering fresh air. Lockwood, U.S. Pat. No. 3,949,548, teaches an exhaust gas recirculation system in which a portion of the exhaust gas is cooled and recirculated through a compressor with a resulting reduction in nitrogen oxide. This system requires two separate compressors, one for ambient air and one for the recycled exhaust gas. The use of exhaust gas recirculation has not been applied to stationary gas turbines in practice because of the problems associated with cooling the exhaust gases, the requirements for high fluid flow as in Stettler, or the complications and expense of multicompressor systems as in Lockwood.

It is the object of this invention to provide a means for controlling NOx emissions from a conventional stationary gas turbine combustion system by means of exhaust gas recirculation while overcoming the prior art problems associated with cooling the exhaust, mass flow and complex flow routes and expensive equipment.

This and other objects of the invention will become apparent to those skilled in the art from the following detailed description in which FIG. 1 is a flow diagram of one embodiment of the present invention, FIG. 2 is a flow diagram of a second embodiment of the present invention, FIG. 3 is a flow diagram of a third embodiment of the present invention, FIG. 4 is a graph showing the amount of NOx reduction as a function of the recirculation rate at several combustor temperatures using a distillate (i.e., liquid) fuel, and FIG. 5 is a graph showing the amount of NOx reduction as a function of the recirculation rate at several combustor temperatures using a gaseous fuel.

SUMMARY OF THE INVENTION

This invention relates to a method of operating a gas-steam power plant which exhibits improved control of NOx emission and more particularly to a method of operating such a plant recirculating the steam boiler exhaust gases to the gas turbine air compressor, the recirculated gases having been cooled to about the desired compressor inlet temperature. The invention also relates to the combined gas turbine steam turbine power plant.

DESCRIPTION OF THE INVENTION

Exhaust gas recirculation is known to produce low NOx emissions because of the so-called vitiation effect. The recirculation causes the combustor inlet oxygen to be depleted, and the $CO_2$ concentration and moisture content increased relative to a non-recirculation system, all of which features reduce the primary zone peak flame temperature. The rate of formation of NOx is strongly dependent on peak flame temperature and a small decrease in flame temperature lowers the NOx emissions at a non-linear rate. Recirculation of some of the exhaust gas produces vitiated inlet air and will, therefore, reduce the exhaust NOx concentrations.

One of the main problems in applying exhaust gas recirculation to a stationary gas turbine is achieving the reduction in exhaust gas temperature so as not to significantly increase the compressor or the combustor inlet temperatures. Recirculating the gas turbine exhaust gas to the combustor inlet would require the rejection of substantial amounts of heat, in the order of about 20,000–25,000 BTU/sec or more. In accordance with the present invention, it has been discovered that the heat elimination problem can be substantially overcome if the power plant is a gas turbine-steam turbine combined power plant and if the recycled gases are introduced into the single air compressor used to supply air to the gas turbine combustor.

The gas turbine-steam turbine combined power plant is shown, in simplified form, in FIGS. 1, 2 and 3. Air from any suitable source is conveyed by a conduit 1 to air compressor 2 in which it is compressed to the appropriate extent. The compressed gas is then conveyed by conduit 3 into a combustor 4 which is also being supplied with an appropriate fuel through conduit 5. The combustor 4 exhaust is conveyed by conduit 6 into gas turbine 7 and then to steam turbine boiler 8 through a conduit 9. Typically, the exhaust from the steam boiler is conveyed by a conduit 10 into a circulation control unit 12 and then vented.

In accordance with the present invention, the exhaust from the steam boiler 8 is passed through the circulation control unit 12 which can be an adjustable valve or damper or some other type of suitable exhaust gas flow control. Circulation control unit 12 can be controlled such that all of the exhaust gases are vented or a part, but not all, of the exhaust gases are recirculated to at least a part of the stators of the air compressor 2. In the embodiment shown in FIG. 1, a conventional heat exchanger 13 is interposed in a recirculation conduit 14 for the purpose of cooling the recirculating gases to about the desired compressor inlet temperature. In this embodiment, the use of the conventional heat exchanger permits the useful heat rejected to be recovered in the form of hot water for heating the other applications.

In the embodiment of FIG. 2, the heat exchanger 13 is not used and instead the recycling gases are conveyed by conduit 14 directly into the ambient air conduit 1. Interposed in conduit 1 downstream of the mixing point is an evaporative cooler 15 which can be the same as the evaporated coolers now in use on gas turbines used in desert climates. The embodiment of FIG. 2 has the added advantage of increasing the combustor inlet humidity which will decrease the NOx below the level normally attained by exhaust gas recirculation as in the system of FIG. 1.

A third embodiment of the present invention is shown in FIG. 3. In this variation of the invention, the heat is rejected in air compressor 2. This is accomplished by water-cooling several stages of the air compressor stator vanes through supply line 16. This arrangement provides a large surface area in contact with the high velocity air which helps to promote heat transfer from the gas to the cooling fluid.

Recirculation control unit 12 diverts steam boiler exhaust into recirculation conduit 14 only when the power plant is operating from about 25 to 100% load.

When the power plant of the present invention is operated as described above, it has been found that the quantity of recirculated steam boiler exhaust gases need not exceed about 30% by volume of the fluid flow through air compressor 2 in order to realize a sufficient degree of NOx emission reduction. Preferably the recirculation is less than about 25% and most preferably less than about 20% of the air compressor fluid flow. In most cases, the recirculation flow will be at least about 10%. Indeed, it has been found that the proposed Governmental Codes can be satisfied with about 17% recirculation gas flow with current turbine inlet temperatures. Of course, a greater reduction can be realized at higher recirculation rates and, if necessary, the recirculation can be combined with the introduction of water or steam into the combustor.

In order to demonstrate the present invention, the effect of recycling in accordance with the present invention was simulated in a gas turbine using fresh air and vitiated air at various recirculation rates for both a liquid fuel (No. 2 distillate) and a gaseous fuel (propane). All data was corrected to ISO humidity (0.0063 Kg/Kg of dry air) and the percentage of NOx reduction as a function of the recirculation rate is shown in FIGS. 4 and 5 for the liquid fuel and gaseous fuel, respectively. These figures show that the NOx reduction increases linearly with the combustor exit temperature at any given recirculation rate.

Various changes and modifications can be made in the process and power plant of the present invention without departing from the spirit and scope thereof. The various embodiments which have been disclosed herein were for the purpose of further illustrating the invention but were not intended to limit it.

What is claimed is:

1. A method of operating a combined gas-steam power plant with improved control of NOx emissions comprising compressing air in an air compressor, introducing said compressed air and fuel into a combustor and burning the resulting mixture therein, employing the combustor exhaust gases to operate a gas turbine, employing the gas turbine exhaust gases to operate a steam boiler, venting a portion of the steam boiler exhaust gases, cooling the remaining portion of the steam boiler exhaust gases to about the desired air compressor inlet temperature, introducing said cooled steam boiler exhaust gases into said air compressor, and controlling the relative rate of venting and introduction to said air compressor such that said cooled steam boiler exhaust gases comprise up to about 30% of the fluid flowing through said air compressor.

2. The method of claim 1 wherein cooling said remaining portion of the steam turbine exhaust gases is effected in a heat exchanger.

3. The method of claim 1 wherein said cooling is effected by mixing said remaining portion of the steam boiler exhaust gases with said air and subjecting the mixture to evaporative cooling prior to introduction of said mixture into said air compressor.

4. The method of claim 1 wherein said steam boiler exhaust gases are cooled in said air compressor.

5. The method of claim 4 wherein said steam boiler exhaust gases are cooled by heat exchange with a coolant circulating through at least a part of the stators of said air compressor.

6. The method of claim 1 wherein said cooled steam boiler exhaust gases comprise up to about 25% of the fluid flowing through said air compressor.

7. The method of claim 6 wherein said exhaust gases is up to about 20%.

* * * * *